United States Patent [19]
Leonard et al.

[11] Patent Number: 5,466,000
[45] Date of Patent: Nov. 14, 1995

[54] FLAT-LYING CUTTER/RIPPER FOLDABLE INTO UPSTANDING POSITION DURING DEPLOYMENT OF A VEHICLE AIRBAG FOR DETACHING A DEPLOYMENT DOOR FROM A PANEL

[75] Inventors: Timothy J. Leonard, Stuttgart, Germany; Daniel W. Anderson, South Weber, Utah

[73] Assignee: Morton International, Inc., Chicago, Ill.

[21] Appl. No.: 341,677

[22] Filed: Nov. 17, 1994

[51] Int. Cl.⁶ ............................................. B60R 21/16
[52] U.S. Cl. ............................. 280/728.3; 280/732
[58] Field of Search ....................... 280/728 B, 732, 280/752, 753, 728.3

[56] References Cited

U.S. PATENT DOCUMENTS

| | | | |
|---|---|---|---|
| 3,799,576 | 3/1974 | Fiala | 280/731 |
| 3,837,669 | 9/1974 | Nagazumi et al. | 280/731 |
| 4,097,064 | 6/1978 | Ikawa et al. | 280/732 |
| 4,989,896 | 2/1991 | DiSalvo et al. | 280/732 |
| 5,035,444 | 7/1991 | Carter | 280/732 |
| 5,046,758 | 9/1991 | Rafferty et al. | 280/732 |
| 5,060,971 | 10/1991 | Nanbu et al. | 280/728 |
| 5,082,310 | 1/1992 | Bauer | 280/732 |
| 5,108,128 | 4/1992 | Parker et al. | 280/732 |
| 5,154,444 | 10/1992 | Nelson | 280/732 |
| 5,161,819 | 11/1992 | Rhodes, Jr. | 280/728 |
| 5,277,443 | 1/1994 | Grant et al. | 280/732 |
| 5,280,947 | 1/1994 | Cooper | 280/728 B |
| 5,292,151 | 3/1994 | Parker | 280/728 B |
| 5,316,335 | 5/1994 | Gray et al. | 280/728 B |

Primary Examiner—Margaret A. Focarino
Assistant Examiner—Paul N. Dickson
Attorney, Agent, or Firm—George W. Rauchfuss, Jr.; Gerald K. White

[57] ABSTRACT

In a vehicle airbag installation in which a deployment door in a panel becomes detached along a tearable region of the panel for creating an outlet in the panel through which an inflating airbag deploys, apparatus for detaching the deployment door at such a tear region includes a cutter/ripper which is flat-lying in an inactive position. During deployment of the airbag a cutting part of the cutter/ripper is pushed forwardly for swinging into an upright active position for detaching the deployment door. This forward swinging involves a hinge-like bending or folding of an intermediate region of the cutter/ripper causing two simultaneous components of motion. In a first motion, the cutting part is moving away from the outlet being created thereby compressing and inhibiting fragmentation of nearby core foam in the panel. In a second motion the cutting part extends forwardly into a confining position for retaining core foam between front and rear surface layers of the panel. A substrate of the deployment door may serve as a pushing element which thrusts forwardly against the cutting part of the cutter/ripper for swinging it into upright active position. In addition to the flat-lying cutter/ripper, a flat-lying cutter/tearer may be mounted on the door substrate extending beyond a perimeter of the substrate into overlapping relationship with the cutter/ripper for cooperative cutting action of the cutters in detaching the deployment door along the tear region during deployment of the airbag.

19 Claims, 5 Drawing Sheets

FLAT-LYING CUTTER/RIPPER FOLDABLE INTO UPSTANDING POSITION DURING DEPLOYMENT OF A VEHICLE AIRBAG FOR DETACHING A DEPLOYMENT DOOR FROM A PANEL

TECHNICAL FIELD

This invention relates to the field of motor vehicle airbag deployment systems. More specifically the present invention relates to a flat-lying cutter/ripper which normally is oriented in an inactive position. An intermediate region of this cutter/ripper becomes folded for moving a cutting edge margin from its inactive, flat-lying orientation into an upstanding (upright) active position during deployment of an airbag. The cutter/ripper is mounted and arranged so that it becomes bent from its inactive flat-lying position into its active, upstanding orientation during deployment of the airbag for detaching a deployment door along a tearable region in a vehicle panel for opening a doorway through the panel through which the inflating airbag deploys into a passenger compartment in the vehicle.

BACKGROUND OF THE DISCLOSURE

There are vehicle airbag installations wherein a panel has a deployment door which is integral with the panel. This door becomes opened during inflation of the airbag for providing a doorway outlet through the panel through which the inflating airbag deploys into the passenger compartment. The panel includes a tearable region, which may be called a tear region, serving as a boundary of the deployment door and which joins the deployment door with remaining areas of the panel in integral relationship. During deployment of the airbag, the deployment door is detached along the tear region from the panel for opening the doorway outlet.

The vehicle panel in which the deployment door is located may be an instrument panel or may be a side panel in the vehicle or may be some other panel appropriately positioned in the vehicle for deployment of an airbag into the passenger compartment. The panel has a front surface exposed to the passenger compartment and a rear surface behind which an airbag module is located.

In order to cut, tear and/or rip open the tear region in the panel, for detaching the deployment door along the tear region from remaining areas of the panel for opening a doorway outlet, it is conventional for a cutter to be aligned with the tear region. The inflating airbag provides driving force for pushing the cutter through the panel at the tear region for detaching the deployment door from the remainder of the panel along the tear region.

In the prior art such cutters are oriented in upright (upstanding) relationship. In other words, prior art cutters are oriented generally perpendicular to front surfaces of their panels so that their cutting edges are aimed forwardly at tear regions in their panels.

Problems with such prior art cutters can arise due to their always being oriented upright in their active cutting positions relative to front surfaces of panels at the tear regions. Such problems arise in the event that a person's head, chest, hand, arm or shoulder, etc. might impact against the panel near the tear region at a time when the airbag has not become deployed from its normal position behind the panel. The person's impact may depress a region of the panel against the cutter, thereby causing the cutter to protrude through the panel, and allowing the resultant protruding upright cutter to contact part of the person's body.

SUMMARY OF THE DISCLOSURE

Accordingly, it is among the objects of the present invention to overcome or substantially reduce such problems by providing a flat-lying cutter/ripper which remains in an inactive, non-cutting orientation until a force provided by an inflating airbag folds an intermediate region of the cutter/ripper for moving its cutting edge margin into upstanding active relationship with respect to a tearable region in a panel. This folding action serves to swing the cutting margin forwardly along an arc sufficiently far for detaching the deployment door along the tear region from the remainder of the panel, thereby allowing the deployment door to open for creating a doorway outlet in the panel through which the inflating airbag can deploy.

In accordance with the present invention in one of its aspects improved deployment door detaching apparatus is provided in vehicle airbag installations wherein a panel has a front surface exposed to a passenger compartment in the vehicle and a rear surface behind which an airbag module is located. The panel has at least one tearable region therein associated with an integral deployment door in the panel. During deployment of the airbag this integral deployment door becomes detached along such tear region from a remainder of the panel for providing a doorway outlet through the panel through which the airbag during its inflation deploys into the passenger compartment. This apparatus comprises at least one cutter/ripper having first and second portions. This cutter/ripper has a foldable or bendable intermediate region intermediate its first and second portions. Mounting means serve to mount the first portion of the cutter/ripper in fixed position relative to the panel with its second portion being positioned at the tear region. This second portion of the cutter/ripper has cutting means lying flat relative to a front surface of the panel near the tear region so that this cutting means is in inactive position relative to the tear region. During inflation and deployment of the airbag, the intermediate region is bent forwardly for swinging the cutting means forwardly into active upright orientation for detaching the deployment door along the tear region from the remainder of the panel for opening a doorway outlet through which the airbag during its inflation deploys into the passenger compartment.

In an illustrative embodiment of the invention a substrate of the deployment door serves as a pusher element for pushing forwardly on a portion of the cutter/ripper which has the cutting means for bending an intermediate region of the cutter/ripper for swinging the cutting means forwardly into active upright orientation for detaching the deployment door along the tear region.

In a further illustrative embodiment of the invention a cutter/tearer is mounted on a substrate of the deployment door in addition to the cutter/ripper. This cutter/tearer has cutting means lying flat relative to a front surface of the panel near the tear region. This cutting means of the cutter/tearer extends beyond a perimeter of the door substrate and overlaps a cutting portion of the cutter/ripper so that the cutter/ripper and cutter/tearer cooperate with each other in detaching the deployment door from the remainder of the panel.

In illustrative embodiments of the invention the cutter/ripper is shown as an elongated strip having first and second margins extending generally parallel with each other and an intermediate bendable or foldable region serves as a hinge extending longitudinally along the strip intermediate the first and second margins. The first margin serves for mounting the cutter/ripper strip and the second margin has cutting means extending along it.

BRIEF DESCRIPTION OF THE DRAWINGS

The invention, together with further objects, features, advantages and aspects thereof, will be more clearly understood from the following detailed description considered in conjunction with the accompanying drawings which are not drawn to scale with emphasis instead being placed upon clearly illustrating the principles of the invention. Like reference numerals indicate like elements or like components throughout the different views.

The accompanying drawings, which are incorporated in and constitute a part of the specification, illustrate presently preferred embodiments of the invention and, together with the general description set forth above and the detailed description of the preferred embodiments set forth below, serve to explain the principles of the invention. In these drawings:

FIG. 3 is a perspective view of a vehicle airbag installation embodying the invention. This installation includes a panel, a deployment door which is integral with the panel, and an airbag module located behind the panel and aligned with the deployment door. In FIG. 3 a free edge of the panel and its integral deployment door are shown facing generally toward a person who is viewing this FIG. 3.

FIG. 4 is an enlarged partial sectional view showing one embodiment of the invention. FIG. 4 is a view as seen from a position 4—4 in FIG. 3 for more clearly illustrating a region of FIG. 3 which is circled.

FIG. 5 is an enlarged view similar to FIG. 4 for showing another embodiment of the invention. FIG. 5 is a view as seen from a position 5—5 in FIG. 3 for more clearly illustrating the region of FIG. 3 which is circled.

FIG. 6 is a plan view of a flat-lying cutter/ripper which is seen in end view in FIGS. 4 and 5. FIG. 6 shows a first configuration of cutting means extending along a margin of an elongated cutter/ripper strip.

FIG. 9 is a plan view of a flat-lying cutter/tearer which is seen in end view in FIG. 5 in addition to the cutter/ripper which also is seen in end view in FIG. 5. FIG. 9 shows a first configuration of cutting means extending along a margin of an elongated cutter/tearer strip.

DETAILED DESCRIPTION OF PREFERRED EMBODIMENTS

Figure 1:
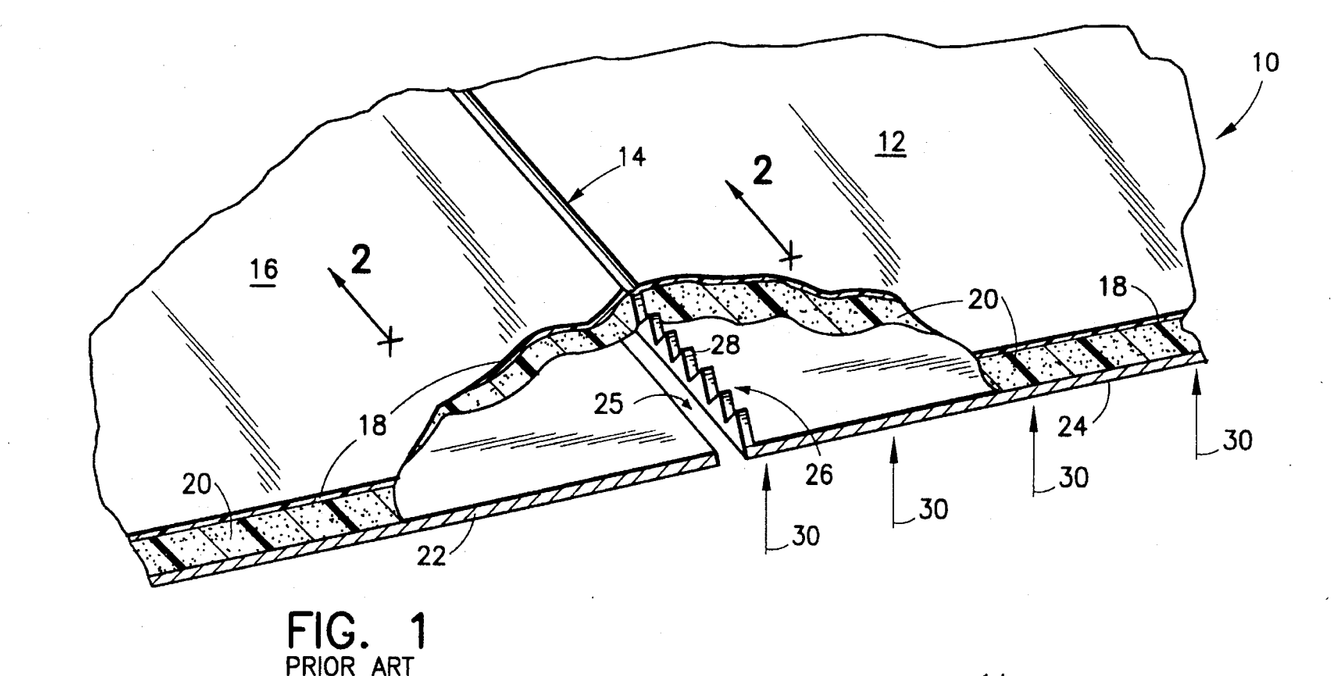
FIG. 1 is a perspective and partial sectional view of a portion of a vehicle airbag installation, being illustrative of a prior art installation having an upright (upstanding) cutter aimed forwardly at a tear region in a panel. The panel is shown broken away for more clearly revealing the cutter.
Figure 2:
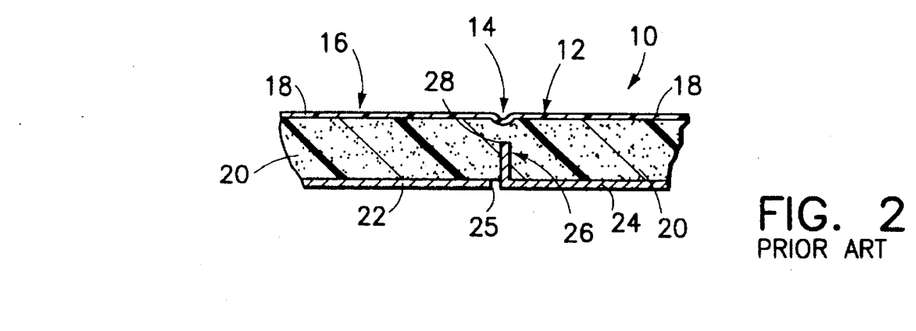
FIG. 2 is a cross-sectional view as seen from the position 2—2 in FIG. 1 for showing more clearly the upstanding cutter which is oriented substantially perpendicular to the nearby front surface of the panel.

For better appreciation of features, advantages and principles of the present invention, it is helpful initially to consider FIGS. 1 and 2 which illustrate prior art. There is shown a molded plastic panel 10 having a deployment door 12 with a tear region 14 which outlines the deployment door. This tear region integrally connects the deployment door with the remainder 16 of the panel.

The panel 10 may be an instrument panel or a side panel in a vehicle door or may be some other panel appropriately positioned in the vehicle for deployment of an inflating airbag into the passenger compartment. The molded plastic material of which the panel 10 is formed does not comprise part of the present invention. This material may be any material suitable for forming such a panel, for example such as a vinyl material. As shown, the panel 10 has a front surface layer 18, which may be called a "skin", with a core 20 of plastic foam sandwiched between the front layer 18 and a rear substrate layer 22. The front surface of the skin layer 18 is exposed to a passenger compartment, and an airbag module (not shown) is located behind the panel positioned rearwardly from the deployment door 12. There is a door substrate 24 with core foam 20 sandwiched between the front layer 18 of the deployment door and the door substrate. This door substrate 24 is shown positioned in an opening 25 in the panel substrate 22.

In order to detach the deployment door 12 from the remainder 16 of the panel 10 during deployment of an airbag for opening a doorway outlet through the panel, an upright (upstanding) cutter 26 is positioned rearwardly from the panel front layer 18 with its cutting edge 28 aimed forwardly at the associated tear region 14. This upright cutter 26 is shown formed as part of the door substrate 24.

During deployment of an airbag, the inflating airbag moves forwardly as shown by arrows 30 and pushes against door substrate 24. Pushing the door substrate 24 forwardly, causes the cutter 26 to cut core foam 20 and surface layer 18 at the tear region 14, thereby detaching the deployment door 12 from the remainder 16 of the panel. The inflating airbag deploys through the substrate opening 25 and out through a doorway outlet provided in the panel surface layer 18 by such detachment of the deployment door 12. Described in the BACKGROUND above are those problems associated with prior art airbag installations involving upright (upstanding) cutters 26 which are always oriented in their active positions. The reader may refer there for a description of such problems.

For convenience of description and understanding the terms "front", "forward", "forwardly" and the like, and the terms "rear", "rearward", "rearwardly", "behind" and the like are employed with reference to the general direction 30 in which an inflating airbag deploys. Also the "front" surface of the panel is the surface which is exposed to the passenger compartment, while the "rear" surface faces generally away from the passenger compartment. These convenient terms of description are not intended as limiting with respect to various possible mounting positions and orientations of a panel in a vehicle. For example, in the case of an instrument panel its "front" surface (as the term is used herein) actually may be facing generally toward the back end of the vehicle. For example, in the case of a side panel located in a vehicle door, its "front" surface as used herein may be facing generally toward left or right with respect to a line of travel of the vehicle. The terms "foldable" and "bendable" are intended to have similar meaning. Also, it is noted that an "airbag" often is called an "inflatable cushion" or the like. The terms "tearable region" and "tear region" are intended to include a tear seam.

Figure 3:
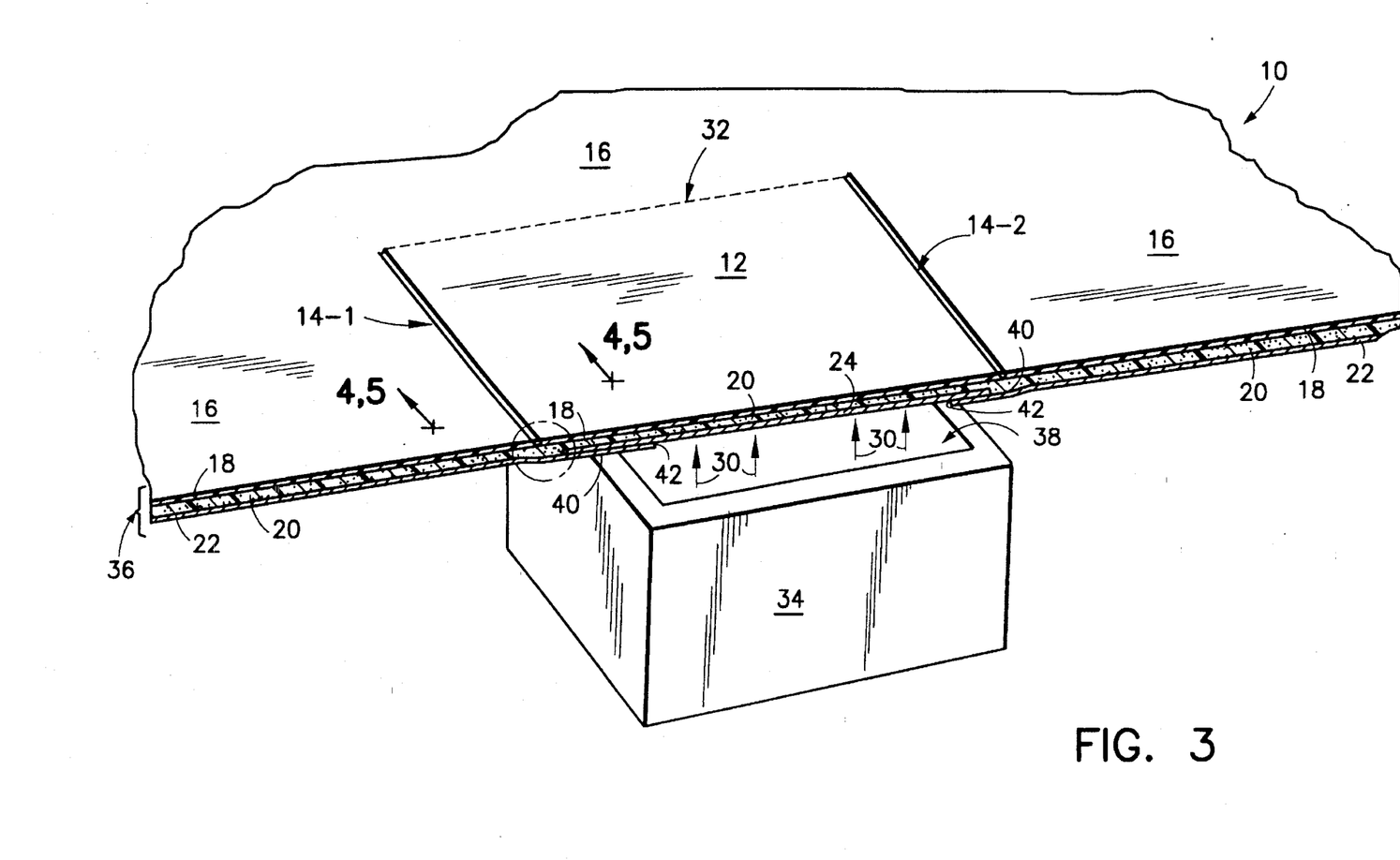

Inviting attention to FIG. 3, a vehicle airbag installation embodying the invention includes a panel 10 having a deployment door 12 which is integral with the panel. An airbag module 34 is located behind the panel and is aligned with the deployment door 12. A free edge (indicated by a bracket 36) of the panel 10 is shown facing generally toward a person viewing this FIG. 3.

During deployment, an inflating airbag issues through an airbag module exit 38, which faces the door substrate 24, and the inflating airbag moves forwardly as shown by arrows 30. Thus, the inflating airbag pushes forwardly against the door substrate 24, thereby providing a forward driving force applied to the door substrate.

Figure 4:
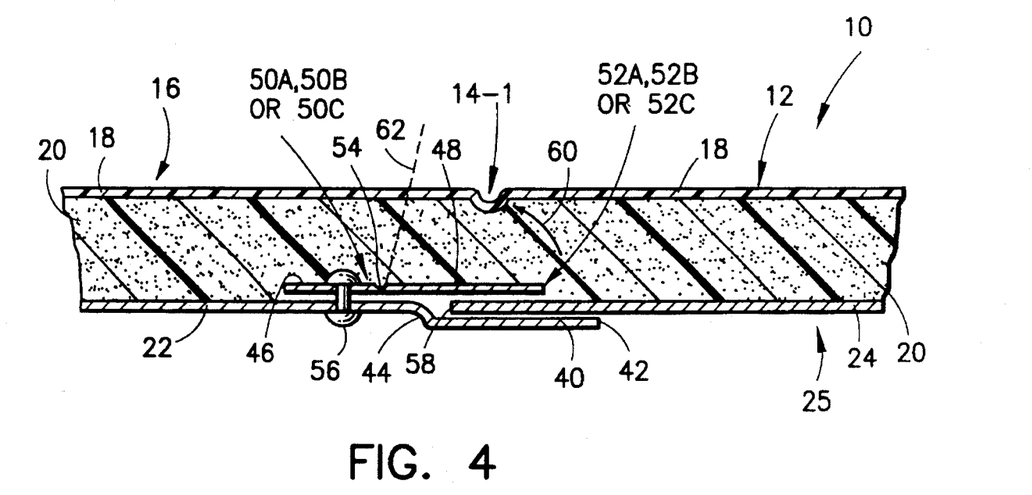

As shown in FIG. 4, the panel substrate layer 22 may be formed to provide a support ledge 40 whose rim 42 is adjacent to the opening 25 in the panel substrate. This support ledge 40 is shown rearwardly offset at 44 relative to an adjacent portion of the panel substrate 22. Thus, the rearward offset 44 may be employed as a locating shoulder for centering and aligning the door substrate 24 in relationship to the opening 25 in the panel substrate 22.

A cutter/ripper 50A, 50B or 50C (Please see also FIGS. 6, 7 and 8.) is shown as an elongated strip having a first portion 46 in the form of an elongated margin and a second portion 48 in the form of another elongated margin. The second margin 48 is shown in these three Figures shaped with three illustrative configurations of a cutting edge 52A, 52B or 52C, respectively. These margins 46 and 48 are generally parallel, and the cutter/ripper 50A, 50B or 50C has an intermediate foldable (bendable) region 54 which is indicated by dashed lines. This intermediate region 54 extends longitudinally along the cutter/ripper intermediate its first and second margins 46 and 48 and serves as a hinge, as will be explained later.

Figure 5:
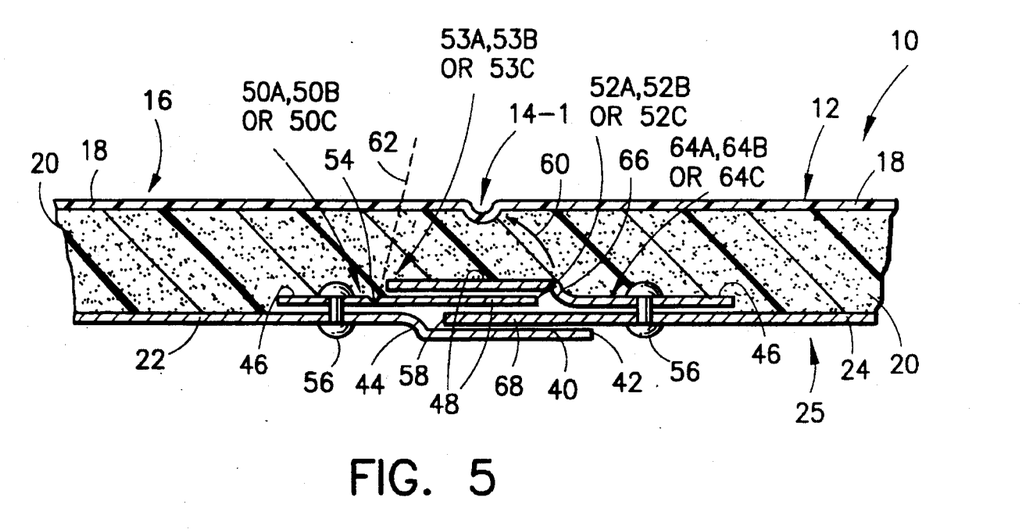

As is shown in FIGS. 4 and 5, the first margin of the cutter/ripper 50A, B or C is mounted in fixed position relative to the panel 10 by fastening means 56 shown as a plurality of rivets substantially uniformly spaced in a row extending along the first margin 46. These rivets 56 are shown passed through suitable holes in the cutter/ripper and through corresponding holes in the panel substrate 22 for mounting this cutter/ripper in fixed position on the panel substrate with its second margin 48 overlapping a perimeter portion of the door substrate 24. The rivet attachment means 56 are shown located farther from the substrate opening 25 than the offset (locating shoulder) 44 so that this locating shoulder is positioned between the rim 42 of the support ledge 40 and the row of rivets. In effect, the shoulder 44 is located generally beneath the bendable intermediate region 54 of the cutter/ripper 50A, B or C, thus positioning a perimeter 58 of the door substrate 24 behind the cutter/ripper near its intermediate region. This bendable intermediate region 54 provides a hinge as will be explained.

During forward movement 30 (FIG. 3) of the inflating airbag, the door substrate 24 is pushed forcefully against the cutter/ripper 50A, B or C causing it to fold or bend forwardly as indicated by a curved arrow 60 in FIGS. 4 and 5. This forward folding or bending occurs generally along the intermediate region 54 so that it acts as a hinge for swinging the cutting margin 48 forwardly along the arc 60. Thus, the forwardly swinging cutting edge 52A, 52B or 52C becomes oriented into an upright (upstanding) active position shown dashed at 62 in FIGS. 4 and 5 for detaching the deployment door 12 from the remainder 16 of the panel 10. The upswinging cutting edge 52A, B or C is simultaneously moving in two directions as it swings 60 into upright position 62. These two directions are: the cutting edge simultaneously (i) moves laterally away from the doorway being opened and (ii) moves forwardly to cut, tear or rip open a tearable region 14-1 of the panel, which may be called a tear region, for allowing the deployment door 12 to swing forwardly away from a remaining area of the panel, with the deployment door swinging forwardly about its hinge line 32. Advantages resulting from these two simultaneous motions (i) and (ii), that is, two components of motion laterally and forwardly, will be explained later. The whole deployment door 12 including its substrate 24 swings forwardly about the hinge 32 so as to be pushed fully out of the way of the inflating airbag. The inflated airbag protects a passenger from impact against the upright portion 62 of the cutting edge of the cutter/ripper, because its cutting margin 48 does not become oriented upright unless the airbag is inflated into its deployed position.

In both FIGS. 4 and 5, the intermediate hinge region 54 of the cutter/ripper 50A, B or C become bent sufficiently for accomplishing detachment of the deployment door at the tear region. For example, forward swinging hinge-like motion allows the cutting edge 52A, B or C to swing along an arcuate path 60 which extends for at least about 55° in angular motion, and it is preferred that the extent of this angular motion be at least about 65°. In other words, the initially flat-lying second margin 48 becomes reoriented into upright position by forward angular movement for example of at least 55° and more preferably of at least 65°. Thus, the upswinging cutting edge 52A, B or C provides desired detachment along the tear region 14-1. Moreover, advantages result from the two simultaneous components of motion (i) and (ii) described above. By moving (i) away from the doorway being opened in the panel, the upswinging margin 48 and its cutting edge are serving to compress the core foam 20 in the nearby areas 16 of the panel. Thus, the core foam is being pushed away from the doorway and is being compressed such that foam fragmentation is inhibited and reduced. In addition, by moving (ii) forwardly, the bent upright 62 margin 48 of the cutter/ripper advantageously serves to hold and retain the nearby foam 20 in the panel as the deployment door 12 is opened. Thus, core foam 20 in nearby regions 16 of the panel is effectively pushed back away from the doorway while also becoming confined in its initial position between the skin surface 18 and the panel substrate 22 while the deployment door is opening and also after it is fully open.

The embodiment of FIG. 5 is similar to that shown in FIG. 4, except that a flat-lying elongated cutter/tearer strip 64A, 64B or 64C (Please also see FIGS. 9, 10 and 11.) is additionally shown fastened to the door substrate 24 by attachment means 56 shown as rivets. This cutter/tearer 64A, B or C is reversed in position relative to the cutter/ripper 50A, B or C so that the flat-lying cutting edge 52 of the former faces toward the remainder 16 of the panel while the flat-lying cutting-edge 52A, B or C of the latter faces toward the opening 25. The first margin 46 of the cutter/tearer 64A, B or C is fastened to door substrate 24 by a plurality of rivets 56 substantially uniformly spaced in a row extending through holes in this first margin and passed through corresponding holes in the door substrate. The second margin 48 of this cutter/tearer 64A, B or C is shown overlapping the second margin 48 of the cutter/ripper 50A, B or C. In FIG. 5 the extent of this overlap is shown as being approximately one-half of the width of the cutter/ripper.

Figure 6:
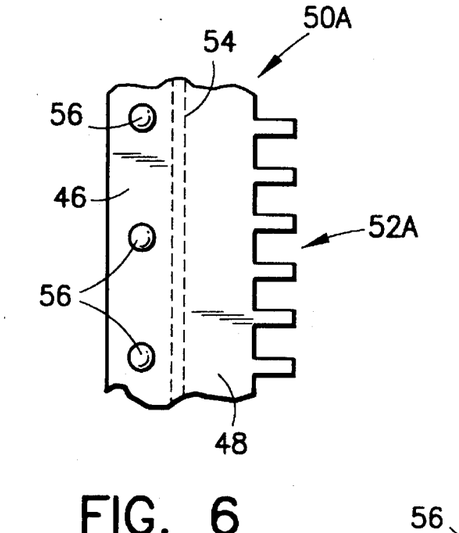
Figure 7:
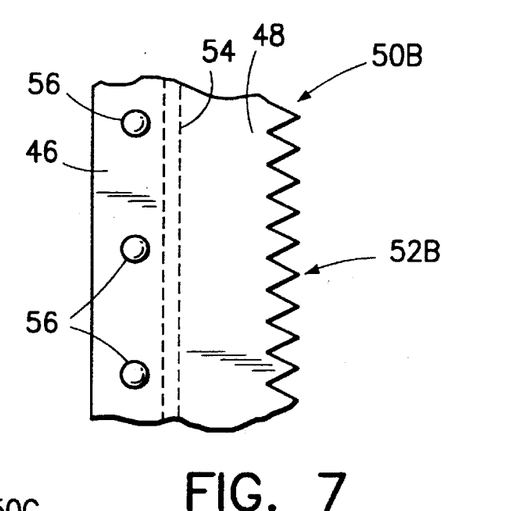
FIG. 7 is a plan view similar to FIG. 6 showing a second configuration of cutting means extending along a margin of an elongated cutter/ripper strip.
Figure 8:
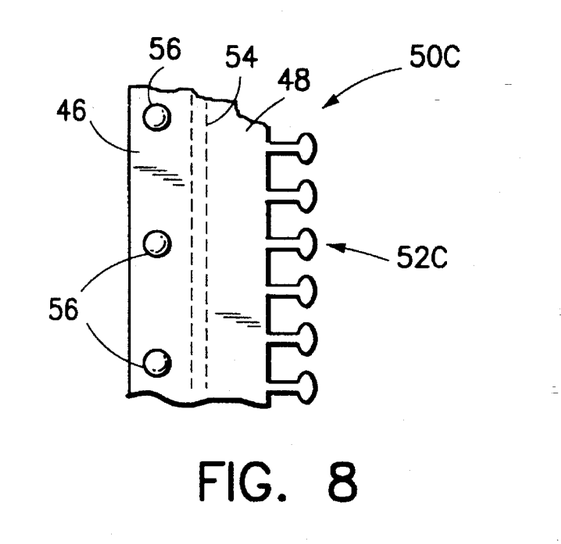
FIG. 8 is a plan view similar to FIGS. 6 and 7 showing a third configuration of the cutting means extending along such a margin.

With reference to FIG. 6, 7 or 8, the cutting edge 52 of the second margin 48 of the cutter/tearer 64A, B or C may be shaped as shown at 52A, 52B or 52C.

Figure 9:
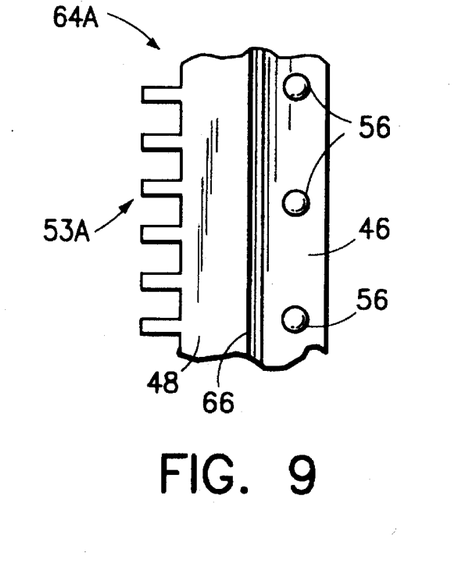
Figure 10:
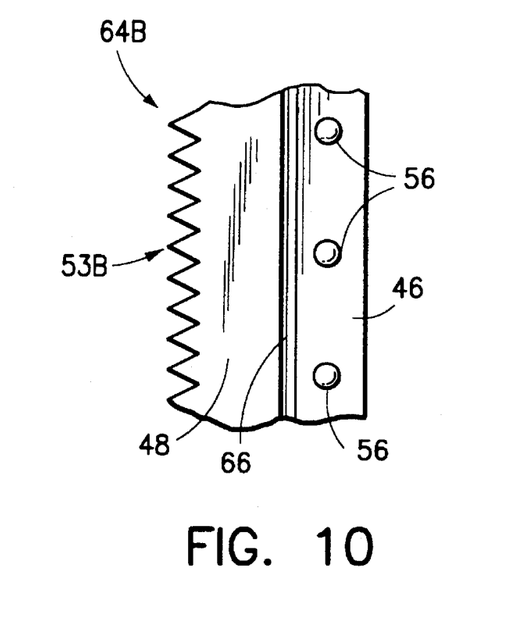
FIG. 10 is a plan view similar to FIG. 9 showing a second configuration of cutting means extending along a margin of an elongated cutter/tearer strip.
Figure 11:
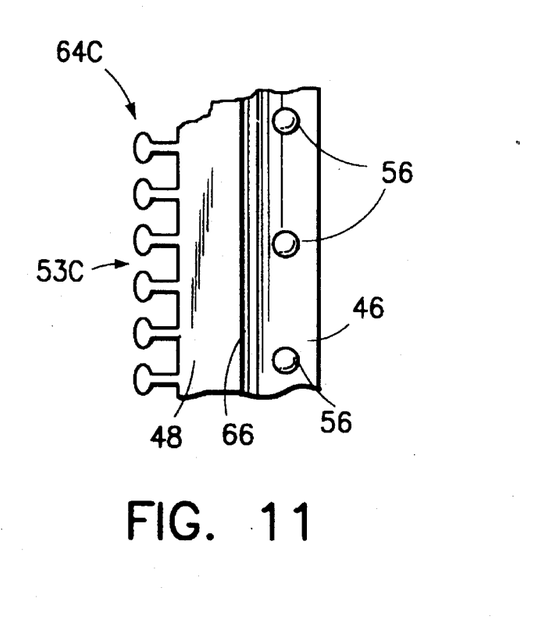
FIG. 11 is a plan view similar to FIGS. 9 and 10 showing a third configuration of cutting means extending along a margin of an elongated cutter/tearer strip.

It is noted that the cutting edge 53A, 53B or 53C of the relatively rigid cutter/tearer 64A, B or C extends beyond the perimeter 58 of the door substrate in overlapping relation with the cutter/ripper for advantageously aiding in cutting free the deployment door for allowing hinging at 32. Also, this elongated cutter/tearer strip may have a longitudinally-extending forward offset 66 for providing clearance for the second margin 48 of the cutter/ripper 50A, B or C to be interposed between a margin 68 of the door substrate and the overlapping second margin 48 of the cutter/tearer. Thus, the cutter/ripper with its bending sweeping motion 60 and the cutter/tearer with its relatively rigid cutting edge 53A, B or C advantageously cooperate with each other in detaching the deployment door 12 from the remainder 16 of the panel.

The advantages as described above more fully in connection with FIG. 4 also apply to FIG. 5, that is, the two components of motion (i) laterally away from the doorway and (ii) upwardly produced by upswinging motion 60 (FIG. 5) of the margin 48 of the cutter/ripper and its cutting edge 52A, B or C push back the nearby core foam 20, thus inhibiting and reducing foam fragmentation while also confining it between the surface 18 and rear substrate 22.

In FIG. 6 a cutting edge 52A of the cutter/ripper 50A is shown having uniformly-spaced, flat-topped cutting teeth and flat-bottom notches between successive teeth. In other words, this cutting edge 52A is castellated.

In FIG. 7 a saw-toothed zig-zag cutting edge 52B of the cutter/ripper 50B is shown having uniformly-spaced cutting teeth.

In FIG. 8 a cutting edge 52C of the cutter/ripper 50C is shown having uniformly-spaced cutting teeth. Each tooth has a straight shank with an enlarged, rounded head such that each tooth has a mushroom-like shape.

In FIG. 9 a cutting edge 53A of the cutter/tearer 64A is shown having uniformly-spaced cutting teeth with castellated configuration.

In FIG. 10 a saw-toothed zig-zag cutting edge 53B of the cutter/tearer 64B is shown having uniformly-spaced cutting teeth.

In FIG. 11 a cutting edge 53C of the cutter/tearer 64C has uniformly-spaced teeth having a mushroom like shape.

FIGS. 4 and 5 are enlarged views of apparatus located in and near the circled region of FIG. 3 for detaching the deployment door along the first tear region 14-1, as seen from positions 4—4 and 5—5 in FIG. 3. It will be understood that the second tear region 14-2 (FIG. 3) also has deployment door detaching apparatus associated with this second tear region which is identical with the apparatus shown in FIGS. 4, 5, 6, 7 and 8, except that the detaching apparatus associated with the second tear region 14-2 is a mirror image of the detaching apparatus associated with the first tear region 14-1.

Since other changes and modifications varied to fit particular vehicle requirements and environments will be recognized by those skilled in the art, the invention is not considered limited to the examples chosen for purposes of illustration, and includes all changes and modifications which do not constitute a departure from the true spirit and scope of this invention as claimed in the following claims and equivalents of claimed elements.

We claim:

1. In a vehicle airbag installation wherein a panel has front and rear surfaces, with said front surface being exposed to a passenger compartment in the vehicle, and wherein the panel has at least one tear region therein associated with a deployment door which is integral with the panel and wherein, during deployment of an airbag module located rearwardly from said deployment door, said deployment door becomes detached at the tear region from a remaining area of the panel for providing a doorway outlet through the panel through which the airbag during its inflation deploys into the passenger compartment, apparatus for detaching the deployment door at the tear region comprising:

at least one cutter/ripper, said cutter/ripper having first and second portions, said cutter/ripper having an intermediate region intermediate said first and second portions, said intermediate region being bendable, said second portion of the cutter/ripper being flat and having cutting means, mounting means for mounting said first portion in fixed position relative to said panel with said cutter/ripper being positioned at said tear region and with said second portion and said cutting means lying flat relative to the front surface of the panel near said tear region, and said intermediate region being bendable forwardly sufficiently during deployment for swinging said cutting means forwardly into an active upright orientation for detaching said deployment door at said tear region.

2. In a vehicle airbag installation, apparatus for detaching a deployment door at a tear region as claimed in claim 1, in which:

prior to deployment of the airbag said second portion of said cutter/ripper extends in front of an element which is positioned in front of the airbag module, and during deployment of the airbag said element is pushable forwardly against said second portion of the cutter/ripper for bending said intermediate region for swinging said cutting means forwardly into said upright active position for detaching said deployment door at the tear region.

3. In a vehicle airbag installation, apparatus for detaching a deployment door at a tear region as claimed in claim 2, in which:

said element in front of which said second portion extends is a substrate part of the deployment door.

4. In a vehicle airbag installation, apparatus for detaching a deployment door at a tear region as claimed in claim 1, in which:

said cutting means is swingable forwardly during deployment of the airbag through an angular change in orientation of at least about 55° into said upright active position.

5. In a vehicle airbag installation, apparatus for detaching a deployment door at a tear region as claimed in claim 3, in which:

a cutter/tearer is mounted on said door substrate, said cutter/tearer has cutting means, said cutting means of said cutter/tearer lie flat relative to a front surface of the deployment door near said tear region, and said cutting means of said cutter/tearer extend beyond a perimeter of the door substrate.

6. In a vehicle airbag installation, apparatus for detaching a deployment door at a tear region as claimed in claim 5, in which:
said second portion of the cutter/ripper extends in front of said perimeter of the door substrate and extends behind said cutting means of the cutter/tearer.

7. In a vehicle airbag installation, apparatus for detaching a deployment door at a tear region as claimed in claim 5, in which:
said second portion of the cutter/ripper is interposed between a margin of the door substrate and said cutting means of the cutter/tearer.

8. In a vehicle airbag installation, apparatus for detaching a deployment door at a tear region as claimed in claim 1, in which:
said forwardly swingable cutting means has two simultaneous components of motion,
the cutting means is movable away from the doorway being opened, and
the cutting means is movable forwardly toward the front surface of the panel sufficiently far for detaching the deployment door at the tear region.

9. In a vehicle airbag installation, apparatus for detaching a deployment door at a tear region as claimed in claim 1, in which:
said cutter/ripper is an elongated strip,
said first and second portions of the cutter/ripper are first and second margins extending generally parallel with each other,
said bendable intermediate region extends longitudinally along said elongated strip, and
said cutting means extend along said second margin of the elongated strip.

10. In a vehicle airbag installation, apparatus for detaching a deployment door at a tear region as claimed in claim 1, in which:
said panel has a foam core between its front and rear surfaces,
said first portion of the cutter/ripper is mounted on the rear surface of the panel,
said cutting means and said second portion of the cutter/ripper are swingable forwardly with two components of motion,
in one component of motion the cutting means and second portion of the cutter/ripper move away from the doorway being opened for pushing nearby core foam in the panel away from the doorway being opened, and
in the other component of motion the cutting means and second portion of the cutter/ripper move forwardly for detaching the deployment door from the panel.

11. In a vehicle airbag installation, apparatus for detaching a deployment door at a tear region as claimed in claim 10, in which:
forward movement of the cutting means and second portion of the cutter/ripper reorients said second portion into a confining relationship in which said second portion extends between the rear and front surfaces of the panel for confining the core foam between the front and rear surfaces of the panel.

12. In a vehicle airbag installation, apparatus for detaching a deployment door at a tear region as claimed in claim 11, in which:
said cutter/ripper is an elongated strip,
said first and second portions of the cutter/ripper are first and second margins extending generally parallel with each other,
said bendable intermediate region extends longitudinally along the elongated strip,
said cutting means extend along said second margin of the elongated strip,
forward movement of the cutting means and second margin of the cutter/ripper reorients the cutting means forwardly by an angular change of at least about 65° from its initial flat-lying position for reorienting the second margin forwardly into a confining position between the rear and front surfaces for confining the core foam between the front and rear surfaces near the doorway outlet as the deployment door is being opened and after it has become opened.

13. In a vehicle airbag installation wherein a panel has front and rear surfaces, with said front surface being exposed to a passenger compartment in the vehicle and said rear surface facing generally away from the passenger compartment, and wherein the panel has at least one tear region therein associated with an integral deployment door of the panel and wherein during deployment of the airbag said integral deployment door becomes detached along said tear region from a remaining area of the panel for providing a doorway outlet through the panel through which the airbag during its inflation deploys into the passenger compartment and wherein said rear surface is a panel substrate having core foam sandwiched between the front surface and the panel substrate and said panel substrate has an opening therein with a door substrate in said opening, apparatus for detaching the deployment door along the tear region from a remaining area of the panel comprision:
at least one elongated cutter/ripper strip,
said elongated cutter/rutter strip having first and second margins,
said first and second margins being generally flat and parallel,
said cutter/ripper strip having an intermediate region extending longitudinally therealong, said region being intermediate said first and second margins,
said cutter/ripper strip being bendable along said intermediate region,
said first margin of said cutter/ripper strip being mounted in fixed position on said panel substrate with said second margin of said cutter/ripper strip extending between the front panel and the door substrate,
said second margin of said cutter/ripper strip having cutting means extending therealong,
said second margin of said cutter/ripper strip being oriented generally in a flat-lying relationship relative to said front panel surface near said tear region, and
during said inflation of the airbag said door substrate being pushable forwardly against said second margin of the cutter/ripper strip for bending said intermediate region for swinging said second margin forwardly for said cutting means to detach said deployment door along the tear region from the remaining area of the panel for opening a doorway outlet through the panel through which the airbag during its inflation deploys into the passenger compartment.

14. In a vehicle airbag installation, apparatus for detaching a deployment door along a tear region as claimed in claim 13, in which:
during said inflation of the airbag said intermediate region of said cutter/ripper strip is bendable sufficiently for swinging the second margin forwardly from its initial flat-lying position by forward angular change in orientation of at least about 55°.

15. In a vehicle airbag installation, apparatus for detaching a deployment door along a tear region as claimed in claim 14, in which:

said forward angular change in orientation provides two simultaneous components of motion for said second margin of the cutter/ripper strip, in one component of motion the second margin moves away from the doorway outlet being opened for pushing nearby core foam in the remaining area of the panel away from the doorway outlet for inhibiting fragmentation of nearby core foam, and in the other component of motion the second margin moves forwardly into a confining position for confining nearby core foam between the panel front surface and the panel substrate.

16. In a vehicle airbag installation, apparatus for detaching a deployment door along a tear region as claimed in claim 13, in which:

said panel substrate has a support ledge adjacent to said opening in the panel substrate, said support ledge has a rim defining said opening, said support ledge is offset rearwardly from said panel substrate by a rearward offset extending generally parallel with said rim, a margin of said door substrate is seated on said support ledge, and said first margin of said cutter/ripper strip is mounted on said panel substrate near said rearward offset and said second margin of the cutter/ripper strip extends into a position forward of said margin of the door substrate at least partially overlapping the margin of the door substrate.

17. In a vehicle airbag installation, apparatus for detaching a deployment door along a tear region as claimed in claim 16, in which:

said margin of the door substrate has a perimeter, said perimeter of the door substrate is near said rearward offset, and an elongated cutter/tearer strip has first and second margins extending generally parallel with each other, said first margin is mounted on the door substrate, said second margin of the cutter/tearer strip has cutting means extending therealong, and said cutting means of the cutter/tearer strip extend beyond the perimeter of the door substrate into overlapping relationship with respect to the cutting means of the cutter/ripper.

18. In a vehicle airbag installation, apparatus for detaching a deployment door along a tear region as claimed in claim 17, in which:

said elongated cutter/tearer strip has a forward offset extending longitudinally therealong, said cutting means of said cutter/ripper strip comprise a plurality of cutting teeth positioned along the second margin of the cutter/ripper strip, and said plurality of teeth are positioned near said forward offset of said cutter/tearer strip with said second margin of the cutter/tearer strip at least partially overlapping said second margin of the cutter/ripper strip.

19. In a vehicle airbag installation wherein a panel has front and rear surfaces, with said front surface being exposed to a passenger compartment in the vehicle, and wherein the panel has at least one tear region therein associated with a deployment door of the panel and wherein, during deployment of the airbag from an airbag module located rearwardly from said deployment door, said deployment door becomes detached at the tear region from a remaining area of the panel for providing a doorway outlet through the panel through which the airbag during its inflation deploys into the passenger compartment, apparatus for detaching the deployment door at the tear region comprising:

at least one cutter/ripper, said cutter/ripper having first and second parts, said cutter/ripper having a bendable hinge means between said first and second parts comprising bendable means interconnecting said first and second parts, said second part of the cutter/ripper being flat and having cutting means, said first part of the cutter/ripper being mounted in fixed position relative to the panel, said second part and said cutting means being oriented in a flat position relative to the front surface of the panel and in an inactive position relative to the tear region, and during deployment said bendable hinge means being forwardly swingable for swinging said second part with said cutting means forwardly about said hinge means into an upright active position relative to the front surface of the panel for detaching the deployment door at said tear region.

\* \* \* \* \*

UNITED STATES PATENT AND TRADEMARK OFFICE
CERTIFICATE OF CORRECTION

PATENT NO.   : 5,466,000
DATED        : November 14, 1995
INVENTOR(S)  : Leonard et al.

It is certified that error appears in the above-indentified patent and that said Letters Patent is hereby corrected as shown below:

Col. 10, line 30, "comprision" should be -- comprising --.

Col. 10, line 32, "rutter" should be -- ripper --.

Signed and Sealed this

Sixth Day of August, 1996

Attest:

BRUCE LEHMAN

Attesting Officer    Commissioner of Patents and Trademarks